US012068563B1

(12) United States Patent
Cai

(10) Patent No.: US 12,068,563 B1
(45) Date of Patent: Aug. 20, 2024

(54) 360-DEGREE ROTARY ELECTRICAL CONNECTOR ASSEMBLY

(71) Applicant: Winner Industry Company Limited, Hong Kong (HK)

(72) Inventor: Junhao Cai, Guangdong (CN)

( * ) Notice: Subject to any disclaimer, the term of this patent is extended or adjusted under 35 U.S.C. 154(b) by 0 days.

(21) Appl. No.: 18/510,961

(22) Filed: Nov. 16, 2023

Related U.S. Application Data

(60) Provisional application No. 63/463,881, filed on May 3, 2023.

(51) Int. Cl.
*H01R 39/64* (2006.01)

(52) U.S. Cl.
CPC .................................... *H01R 39/64* (2013.01)

(58) Field of Classification Search
CPC ...................................................... H01R 39/64
See application file for complete search history.

(56) References Cited

U.S. PATENT DOCUMENTS 3,853,061 A * 12/1974 Schmidt .................. F42C 21/00 324/72
4,519,666 A * 5/1985 Williams ................. H01R 4/10 439/675
6,884,083 B2 * 4/2005 Shepherd ............... H01R 35/04 439/18
7,066,739 B2 * 6/2006 McLeish ................ H01R 33/20 439/924.1
9,220,361 B1 * 12/2015 Chen ........................ F21V 23/06
2023/0037111 A1 * 2/2023 Arfaoui ................... F21V 23/06
2023/0318216 A1 * 10/2023 Luo ........................ H01R 12/72 439/843

* cited by examiner

*Primary Examiner* — Travis S Chambers
(74) *Attorney, Agent, or Firm* — Muncy, Geissler, Olds & Lowe, P.C.

(57) ABSTRACT

A 360-degree rotary electrical connector may include a male connector and a female connector that are inserted in and match each other. The male connector includes a male connector base, a first electrical connection component fixed at the axis of the male connector base, and a second electrical connection component inserted in the male connector base. The female connector includes a female connector base that is cased in the male connector base by rotating, as well as a third electrical connection component and a fourth electrical connection component that are inserted in the female connector base, the third electrical connection component abuts the first electrical connection component frictionally and the fourth electrical connection component abuts the second electrical connection component frictionally. The male connector and the female connector maintain circuit flow during relative rotation.

13 Claims, 7 Drawing Sheets

360-DEGREE ROTARY ELECTRICAL CONNECTOR ASSEMBLY

CROSS-REFERENCE TO RELATED APPLICATION

The present Application claims priority to U.S. Patent Application No. 63/463,881 filed May 3, 2023, the disclosure of which is incorporated by reference in its entirety.

FIELD OF THE DISCLOSURE

The present disclosure generally relates to rotary electrical connect devices for electrical fixtures, and more particularly to electrical plug and socket combinations allowing power connection and mounting of electrical fixtures at electrical outlets, keeping the power on during 360-degree rotation.

BACKGROUND

A Christmas tree is one of the most famous traditional furnishings on Christmas Day and refers to an evergreen tree decorated with lights and ornaments. Instead of planted Christmas trees, today's Christmas trees are usually industrially imitated trees placed statically in the house, looking dull and lacking fun. Many Christmas trees on the market can rotate slowly in their axial direction through motor driving, increasing the ornamental value of the Christmas trees. However, the traditional power connection structure may cause twisting of wires during the rotation and further affect the product's service life seriously because the ornaments on the Christmas tree are generally powered by external power sources. Meanwhile, since the imitated Christmas trees are usually formed by jointing multiple tree trunks, the existing connectors used at the joints cannot meet the requirements for relative rotation between the tree trunks.

Currently, quick power may provide for pre-installed plugs and sockets on each tree section of an artificial Christmas tree. Each plug is inserted into its corresponding socket, so that it is automatically connected inside the trunk. However, this kind of quick power connector comes with a fixed connecting point; it cannot rotate after being connected. Therefore, consumers cannot stand in a fixed position to complete the decoration of the Christmas tree.

SUMMARY

Embodiments of the present disclosure may provide a 360-degree rotary electrical connector for quickly connecting an electrical fixture with electrical power supply wiring, and for mounting the fixture on a support. Lights may illuminate automatically as each section is connected. In the meantime, a rotary electrical connector according to embodiments of the present disclosure may have the ability to keep the power on during 360-degree rotation.

In a 360-degree rotary electric connector according to embodiments of the present disclosure, the female connector and the male connector are respectively arranged in two relatively rotating parts. Quick connection of the parts may be provided through use of the rotary electric connector. Accordingly, the circuit connection can be maintained during the 360-degree rotation process. It has the advantages of quick and convenient connection, stable power supply, and no effect on the appearance of parts.

Embodiments of the present disclosure may provide a 360-degree rotary electrical connector comprising: a male connector comprising: a male connector base; a first electrical connection component fixed at an axis of the male connector base, the first electrical connection component having a columned contact part; and a second electrical connection component inserted in the male connector base, the second electrical connection component having a conducting ring set at a coaxial spacing with the first electrical connection component. There also may be a female connector comprising: a female connector base that is cased in the male connector base by rotating; a third electrical connection component inserted in the female connector base, wherein the third electrical connection component abuts the columned contact part frictionally; and a fourth electrical connection component inserted in the female connector base, wherein the fourth electrical connection component abuts the conducting ring frictionally, and wherein the male connector and the female connector are inserted in and match each other. The male connector base may also include a first peripheral part; and a first isolating part, wherein the first isolating part is set in the first peripheral part and divides an inner cavity of the first peripheral part into a first wiring cavity and a plugging cavity, and wherein the first and second electrical connection components pass through the first isolating part. The columned contact part and the conducting ring are located in the plugging cavity. The female connector base may also include a second peripheral part with a second wiring cavity set in the second peripheral part; and a second isolating part provided in the second peripheral part, wherein the second isolating part divides the plugging cavity and the second wiring cavity, and wherein the third and fourth electrical connection components pass through the second isolating part. The male connector base may include a mounting part that set on the first isolating part and in the first wiring cavity. The first electrical connection component may include a first limiting part connected with the columned contact part, wherein the first limiting part is connected to a mounting hole in the mounting part through a screw thread. The male connector base may further include a plugging part that is set on the first isolating part and in the plugging cavity. The female connector base may include a jointing part matching the plugging part, wherein the jointing part comprises an inner ring and outer ring that are coaxial and clamped on an inside and outside of a plugging part. The second electrical connection component may include a second limiting part connected with the conducting ring, wherein a curved elastic sheet is provided on the second limiting part, wherein the second limiting part penetrates the first wiring cavity so that the elastic sheet abuts the first isolating part, and wherein the conducting ring covers outside a plugging part and comprises a turning edge for cladding an end face of the plugging part. The third electrical connection component may include a first abutting part, wherein the first abutting part is in a second wiring cavity and abuts a second isolating part; and a third limiting part having a curved elastic sheet, wherein the third limiting part penetrates the second wiring cavity so that the elastic sheet abuts the second isolating part. The fourth electrical connection component may include a second abutting part in the second wiring cavity and abutting the second isolating part; and a fourth limiting part having a curved elastic sheet, wherein the fourth limiting part penetrates the second wiring cavity so that the elastic sheet abuts the second isolating part. The first electrical connection component may include a first wiring part connected with the first limiting part; the second electrical connection component may include a second wiring part connected with a second limiting part; wherein the first and second wiring parts are in the first wiring cavity and extend in the direction of the axis away from the first isolating part; the third electrical connection component may include a third wiring part connected with the first abutting part; and the fourth electrical connection component may include a fourth wiring part connected with the second abutting part, wherein the third and fourth wiring parts are in the second wiring cavity and extend in the direction of the axis away from the second isolating part. An avoiding slot corresponding to the second wiring part may be provided on a first peripheral part. A first sliding chute interconnected with a second wiring cavity may be set on an inner ring and interconnected with an inner cavity of an inner ring, wherein the third limiting part is inserted in the first sliding chute; and a second sliding chute interconnected with the second wiring cavity may be set on the outer ring and interconnected with the inner cavity of the outer ring, wherein the fourth limiting part is inserted in the second sliding chute. A first card slot may be extending axially outside a first peripheral part, the first card slot having a first location hole penetrating a first supporting part; and a second card slot may be extending axially outside a second peripheral part, the second card slot having a second location hole penetrating a second supporting part. The male connector base may include a first supporting part provided symmetrically on two sides of a mounting part and connected to a first peripheral part; and the female connector base may include a second supporting part set symmetrically inside a second peripheral part.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
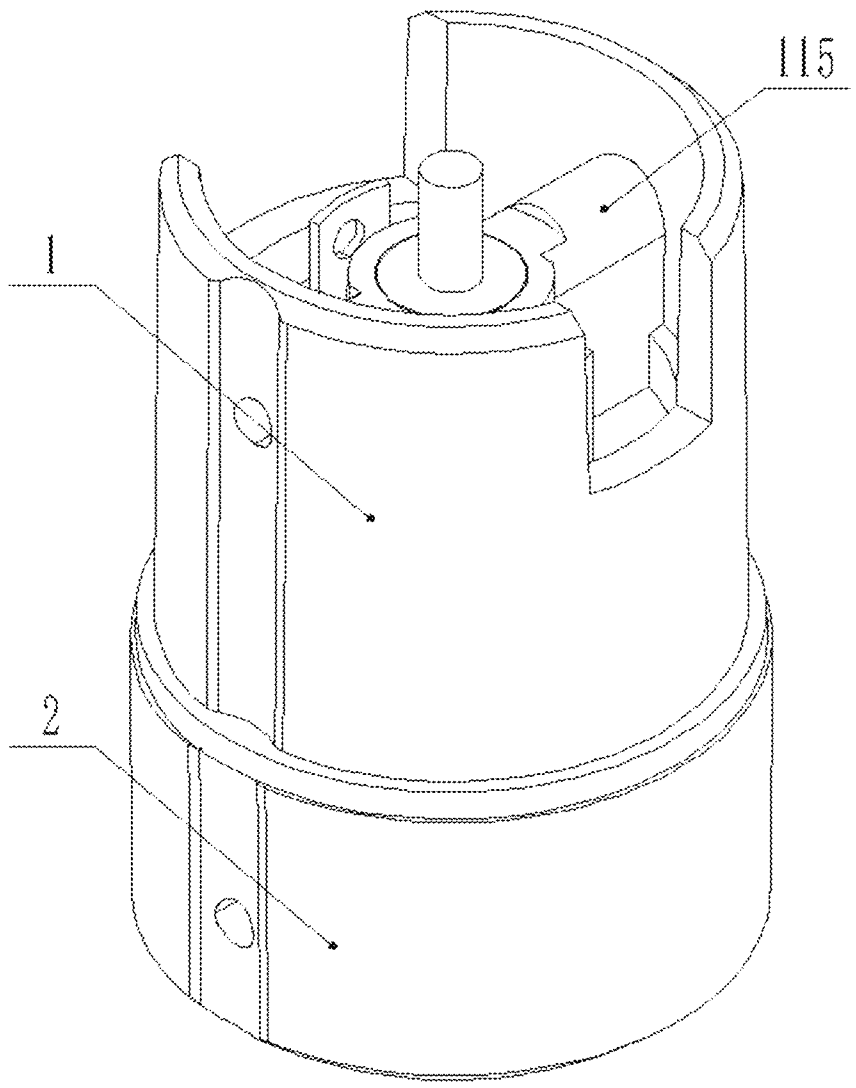
FIG. 1 depicts a 360-degree rotary electrical connector according to an embodiment of the present disclosure.

Embodiments of the present disclosure may provide a 360-degree rotary electrical connector comprising a male connector and a female connector that are inserted in and match each other. The male connector may include a male connector base, a first electrical connection component fixed at the axis of the male connector base, and a second electrical connection component inserted in the male connector base, wherein the first electrical connection component may comprise a columned contact part and the second electrical connection component may comprise a conducting ring set at a coaxial spacing with the first electrical connection component. The female connector may comprise a female connector base cased in the male connector base by rotating, as well as a third electrical connection component and fourth electrical connection component inserted in the female connector base. The third electrical connection component may abut the contact part frictionally and the fourth electrical connection component may abut the conducting ring frictionally.

For the 360-degree rotary electrical connector, its female connector and male connector may be set in two relatively rotating parts respectively, making the electrical connector available to keep power flowing during the 360-degree rotation while realizing fast connection of the parts, hence the advantages of convenient connection and stable power flowing without affecting the appearance of the parts.

The male connector base may comprise a first peripheral part and a first isolating part. The first isolating part may be set in the first peripheral part and divide the inner cavity of the first peripheral part into a first wiring cavity and a plugging cavity. The first and second electrical connection components may pass through the first isolating part. Both the contact part and conducting ring may be located in the plugging cavity. The female connector base may comprise a second peripheral part and a second isolating part. A second wiring cavity may be set in the second peripheral part. The second isolating part may be provided in the second peripheral part and divide the plugging cavity and second wiring cavity. The third and fourth electrical connection components may pass through the second isolating part.

The peripheral parts coordinate with the rotating parts to protect and isolate the internal electrical connection components. The isolating parts get the interior of the connector zoned, avoiding interference between circuits and improve the stability in use.

Further, the male connector base also may comprise a mounting part that may be set on the first isolating part and in the first wiring cavity. The first electrical connection component also may comprise a first limiting part connected with the contact part. The first limiting part may also be connected to the mounting hole in the mounting part through a screw thread. The first electrical connection component may be limited and fixed by the mounting part.

Further, the male connector base also may comprise a plugging part that set on the first isolating part and in the plugging cavity. The female connector base also may comprise a jointing part matching the plugging part. The jointing part may comprise an inner ring and an outer ring that are coaxial and clamped on the inside and outside of the plugging part. The plugging part may coordinate with the jointing part to realize relative rotation while plugging.

Further, the second electrical connection component also may comprise a second limiting part connected to the conducting ring. A curved elastic sheet may be provided on the second limiting part. The second limiting part may penetrate the first wiring cavity so that the elastic sheet abuts the first isolating part. The conducting ring may cover outside the plugging part and may be designed with a turning edge for cladding the end face of the plugging part. The second electrical connection component may be limited radially and circumferentially by inserting in the first isolating part and may be limited axially through the turning edge and elastic sheet, without additional fasteners. This structure may be simple and convenient for disassembly and assembly.

Further, the third electrical connection component also may comprise a first abutting part and a third limiting part. The first abutting part may be in the second wiring cavity and abut the second isolating part. A curved elastic sheet may be provided on the third limiting part. The third limiting part may penetrate the second wiring cavity so that the elastic sheet abuts the second isolating part.

The fourth electrical connection component also may comprise a second abutting part and a fourth limiting part. The second abutting part may be in the second wiring cavity and abut the second isolating part. A curved elastic sheet may be provided on the fourth limiting part. The fourth limiting part may penetrate the second wiring cavity so that the elastic sheet abuts the second isolating part. The third and fourth electrical connection components may be limited radially and circumferentially by inserting in the second isolating part and may be limited axially through the abutting part and elastic sheet, without additional fasteners. This structure is simple and convenient for disassembly and assembly.

Further, the first electrical connection component also may comprise a first wiring part connected with the first limiting part, while the second electrical connection component also may comprise a second wiring part connected with the second limiting part. The first and second wiring parts may be in the first wiring cavity and extend in the direction of the axis away from the first isolating part.

The third electrical connection component also may comprise a third wiring part connected with the first abutting part, while the fourth electrical connection component also may comprise a fourth wiring part connected with the second abutting part. The third and fourth wiring parts may be in the second wiring cavity and extend in the direction of the axis away from the second isolating part. In this structure, electric wires can pass through inside the parts, avoiding affecting the appearance. Further, an avoiding slot corresponding to the second wiring part may be provided on the first peripheral part to avoid the bases from being burnt during the welding for wiring. A first sliding chute interconnected with the second wiring cavity may be set on the inner ring and also may be interconnected with the inner cavity of the inner ring. The third limiting part may be inserted in the first sliding chute. A second sliding chute interconnected with the second wiring cavity may be set on the outer ring and also may be interconnected with the inner cavity of the outer ring. The fourth limiting part may be inserted in the second sliding chute. The limiting part may be further limited by the sliding chute to prevent the limiting part from deformation.

Further, a first card slot may extend axially outside the first peripheral part. The male connector base also may comprise a first supporting part that is provided symmetrically on two sides of the mounting part and connected to the first peripheral part. A first location hole penetrating the first supporting part may be designed in the first card slot. A second card slot may extend axially outside the second peripheral part. The female connector base also may comprise a second supporting part that may be set symmetrically inside the second peripheral part. A second location hole penetrating the second supporting part may be designed in the second card slot. The card slot and location hole make the female connector and male connector convenient for matching and fixing the parts.

Embodiments of the present disclosure may provide a 360-degree rotary electric connector. A 360-degree rotary electrical connector according to embodiments of the present disclosure may provide a male joint and a female joint which may be inserted and matched with each other.

Figure 2:
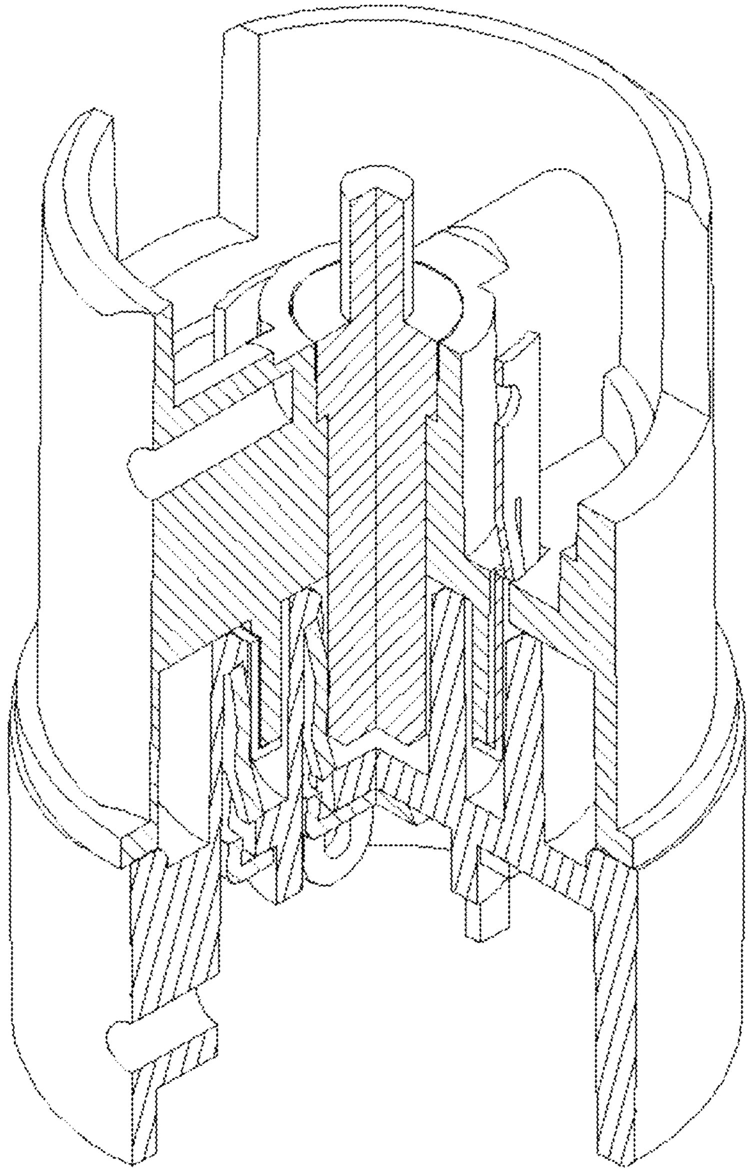
FIG. 2 depicts a cross-sectional view of the 360-degree rotary electrical connector according to an embodiment of the present disclosure.
Figure 3:
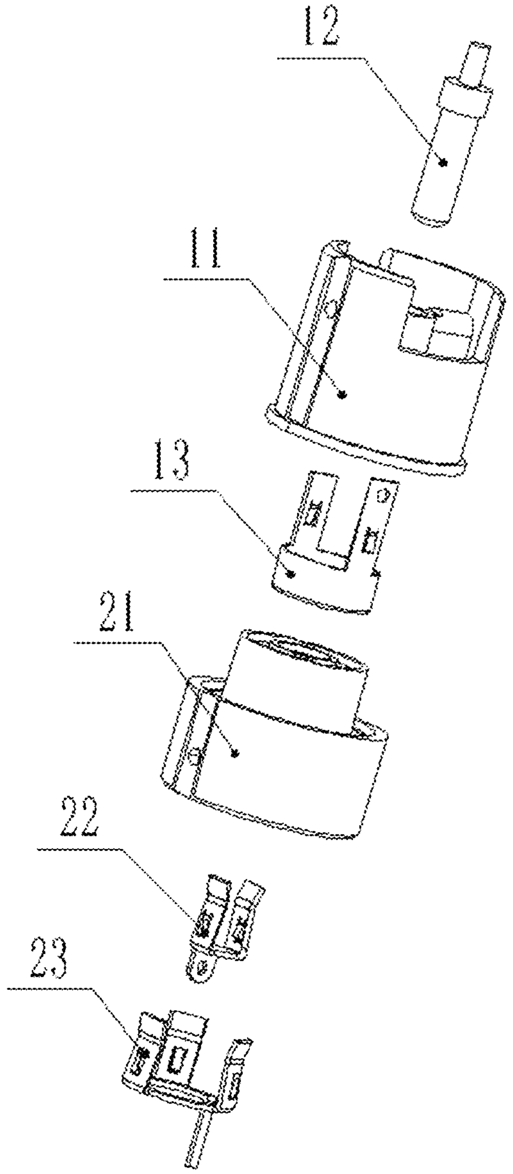
FIG. 3 depicts an exploded view of the 360-degree rotary electrical connector according to an embodiment of the present disclosure.

FIG. 1 depicts a 360-degree rotary electrical connector according to an embodiment of the present disclosure. FIG. 2 depicts a cross-sectional view of the 360-degree rotary electrical connector according to an embodiment of the present disclosure. FIG. 3 depicts an exploded view of the 360-degree rotary electrical connector according to an embodiment of the present disclosure.

Figure 4:
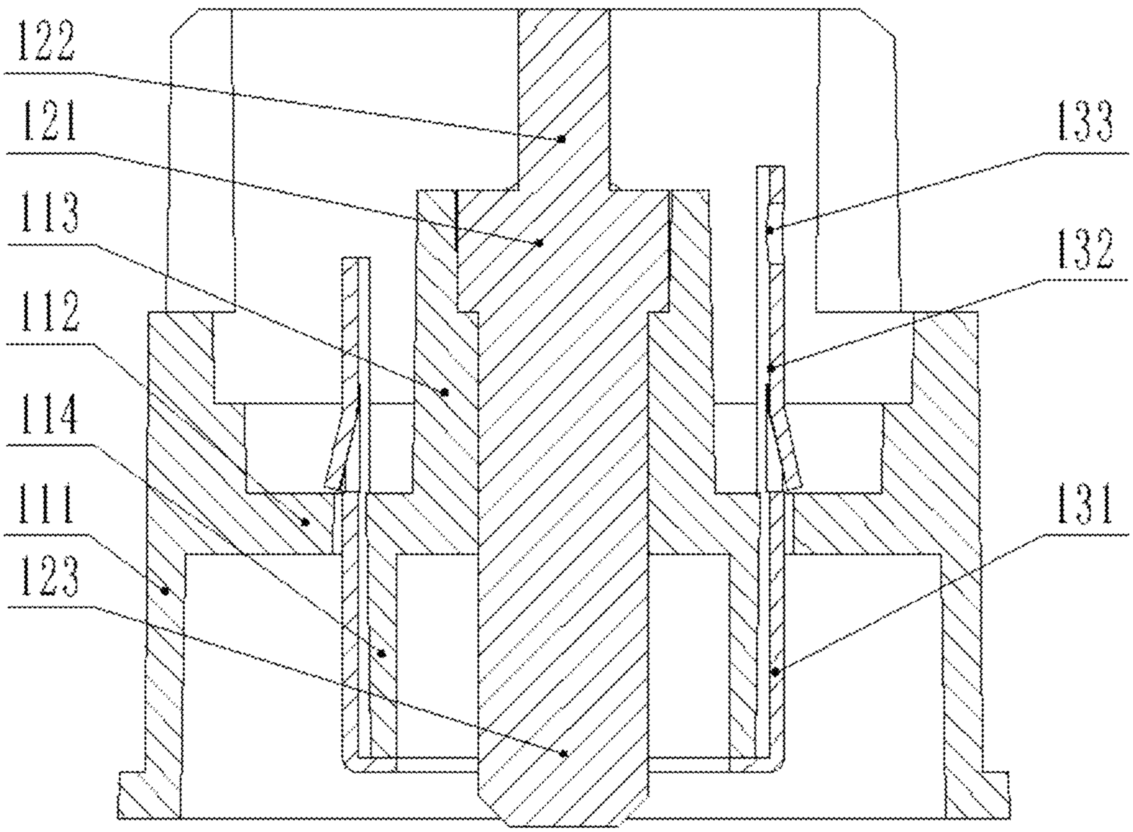
FIG. 4 depicts a cross-sectional view of the male connector of the 360-degree rotary electrical connector according to an embodiment of the present disclosure.

FIG. 4 depicts a cross-sectional view of the male connector of the 360-degree rotary electrical connector according to an embodiment of the present disclosure. The male connector may include a male connector, a first electrical connector fixedly arranged at the axis of the male joint base, and a second electrical connector capable of being inserted in the male connector base. The first electrical connector may include a cylindrical contact portion. The second electrical connector may include a conductive ring coaxially spaced from the first electrical connector.

Figure 5:
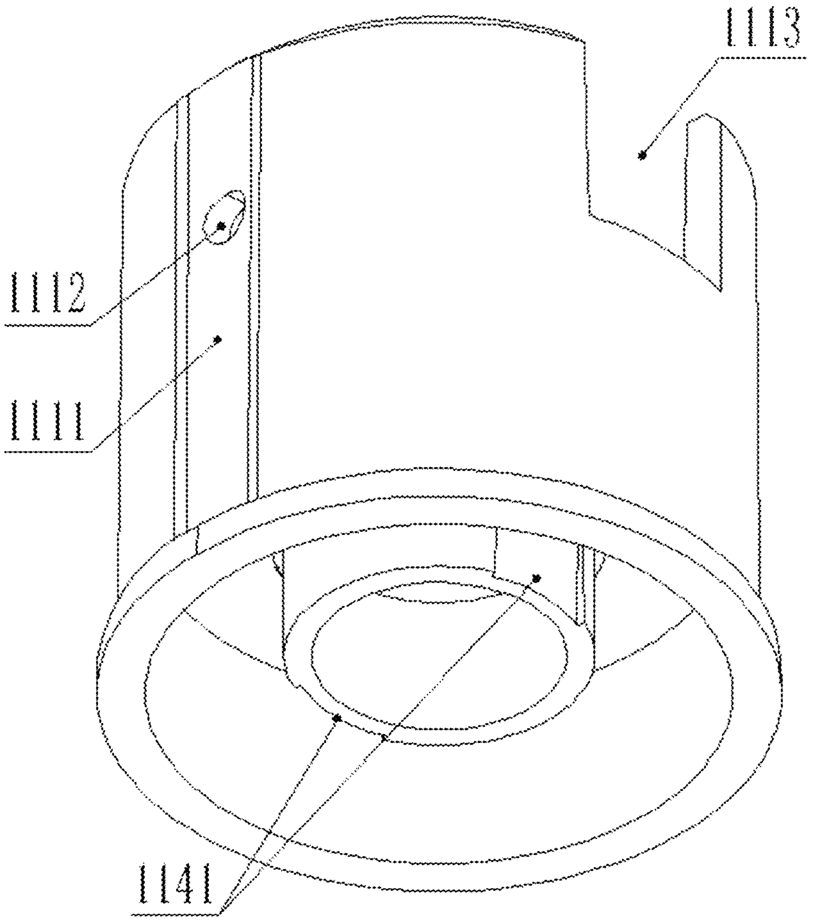
FIG. 5 depicts a view of the male connector base of the 360-degree rotary electrical connector according to an embodiment of the present disclosure.
Figure 6:
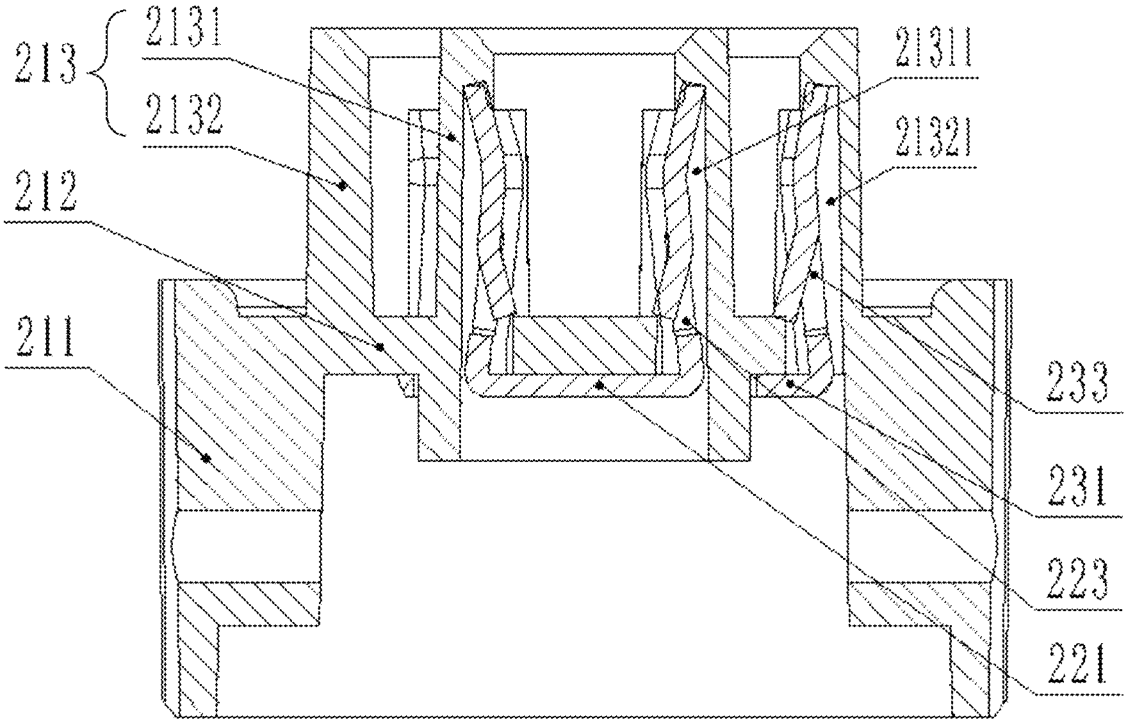
FIG. 6 depicts a view of the female connector of the 360-degree rotary electrical connector according to an embodiment of the present disclosure.
Figure 7:
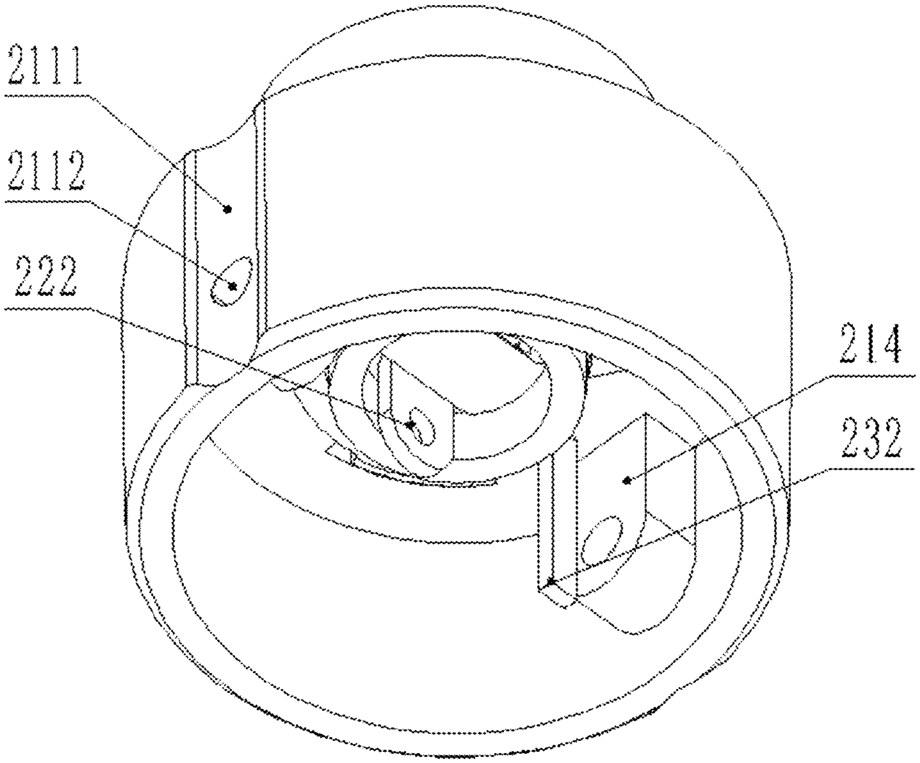
FIG. 7 depicts an overhead axial view of the female connector of the 360-degree rotary electrical connector according to an embodiment of the present disclosure.

FIG. 5 depicts a view of the male connector base of the 360-degree rotary electrical connector according to an embodiment of the present disclosure. FIG. 6 depicts a view of the female connector of the 360-degree rotary electrical connector according to an embodiment of the present disclosure. FIG. 7 depicts an overhead axial view of the female connector of the 360-degree rotary electrical connector according to an embodiment of the present disclosure. The female joint may include a female joint base 360-degree rotatably sleeved on the male joint base, a third electrical connector, and a fourth electrical connector inserted in the female connector base. The third electrical connector may rub against a contact portion, and the fourth electrical connector may rub against a conductive ring.

A 360-degree rotary electrical connector may be used for connecting the trunks of artificial Christmas trees and may comprise male connector 1 and female connector 2 that may be plugged axially and can rotate relatively. Male connector 1 and female connector 2 may be inserted in the connecting pins between adjacent trunks or the connecting pins between adjacent trunks and bases or ornaments respectively and rotate along with the corresponding trunks, bases, or ornaments.

Male connector 1 may comprise male connector base 11, as well as first electrical connection component 12 and second electrical connection component 13 that may be inserted in male connector base 11 (FIG. 3).

Male connector base 11 may adopt an integrated structure, comprising first peripheral part 111, first isolating part 112, mounting part 113, plugging part 114, and first supporting part 115 (FIG. 4). First peripheral part 111 may adopt a hollow tube-type structure and its shape can be designed as per the shapes of the Christmas tree trunks. In this embodiment, the tree trunks are round hollow tubes in which male connector 1 may be inserted. Therefore, first peripheral part 111 may be cylindrical. First card slot 1111 extends axially outside first peripheral part 111 (FIG. 5).

First isolating part 112 may be set in first peripheral part 111 and may divide the inner cavity of first peripheral part 111 into a first wiring cavity and a plugging cavity (FIG. 4).

Mounting part 113 may be connected with first isolating part 112 and located in the first wiring cavity (FIG. 4). Mounting part 113 and first peripheral part 111 may be coaxial. A mounting hole may be provided in mounting part 113.

Plugging part 114 may be connected with first isolating part 112 and positioned in the plugging cavity. Plugging part 114 and mounting part 113 may be coaxial. A plugging hole interconnected with the mounting hole may be provided in plugging part 114.

First supporting part 115 may be provided symmetrically on two sides of the mounting part 113 and connected with first peripheral part 111. The position of first supporting part 115 may be corresponding to first card slot 1111. First location hole 1112 may be set in first card slot 1111, penetrates first supporting part 115, and extends radially but does not penetrate mounting part 113.

First electrical connection component 12 may pass through the mounting hole. First limiting part 121 may be provided on the first electrical connection component and screwed on mounting part 113. One end of first electrical connection component 12 may be designed with first wiring part 122 that extends out of mounting part 113 and in the first wiring cavity. The other end of first electrical connection component 12 may be designed with columned contact part 123 that may be cased in the plugging hole.

Second electrical connection component 13 may adopt an integrated structure, comprising conducting ring 131 and second limiting part 132 connected with conducting ring 131. Conducting ring 131 covers outside plugging part 114. One end of conducting ring 131 may extend to the plugging hole and form a turning edge abutting the end face of plugging part 114, while the other end may be provided with second limiting part 132 that adopts a cambered sheet structure passing through first isolating part 112 and stretching into the first wiring cavity. On second limiting part 132, a curved elastic sheet may be provided and abuts first isolating part 112 so that second electrical connection component 13 may be fixed on the base of male connector 1. In this embodiment, two second limiting parts 132 may be involved and located on two ends of the diameter of conducting ring 131 respectively. On first peripheral part 111, avoiding slot 1113 may be set corresponding to second limiting part 132 to facilitate having the electric wires welded on second limiting part 132 and prevent male connector base 11 from being burnt. Preferably, one of second limiting part 132 may be provided with second wiring part 133, and the corresponding avoiding slot 1113 may be enlarged in size.

To improve the joint stability, guide slot 1141 matching second limiting parts 132 may be set outside plugging part 114. Second limiting parts 132 can be plugged along guide slot 1141 and be limited circumferentially.

Female connector 2 may comprise female connector base 21, as well as third electrical connection component 22 and fourth electrical connection component 23 that may be inserted in female connector base 21.

Female connector base 21 may adopt an integrated structure, comprising second peripheral part 211, second isolating part 212, jointing part 213, and second supporting part 214. Second isolating part 212 may be in second peripheral part 211. Second peripheral part 211 and the inside of second isolating part 212 may form a semi-enclosed second wiring cavity. The outside of second isolating part 212 may be provided with jointing part 213. Jointing part 213 may match plugging part 114 and comprise coaxial inner ring 2131 and outer ring 2132. The outside of second peripheral part 211 may be provided with second card slot 2111 extending axially. Second supporting part 214 may be provided symmetrically inside second peripheral part 211. The position of second supporting part 214 may correspond to second card slot 2111. In second card slot 2111, second location hole 2112 may be set and pass through second supporting part 214.

On inner ring 2131, first sliding chute 21311 interconnected with the second wiring cavity may be provided and interconnected with the inner cavity of inner ring 2131. Third electrical connection component 22 may comprise first abutting part 221, third wiring part 222, and third limiting part 223. First abutting part 221 may be in the second wiring cavity and abuts second isolating part 212. Third wiring part 222 may be connected with first abutting part 221 and extend to the second wiring cavity. Two third limiting parts 223 may be designed, passing through second isolating part 212 and being inserted into first sliding chute 2132. On third limiting part 223, curved elastic sheets may be provided and abut second isolating part 212.

On the outer ring 2132, second sliding chute 21321 interconnected with the second wiring cavity may be provided and interconnected with the inner cavity of outer ring 2132. Fourth electrical connection component 22 may comprise second abutting part 231, fourth wiring part 232, and fourth limiting part 233. Second abutting part 231 may be circular, lies in the second wiring cavity, and abuts second isolating part 212. Fourth wiring part 232 may be connected with second abutting part 231 and extend to the second wiring cavity. Three fourth limiting parts 223 may be provided, passing through second isolating part 212 and being inserted into second sliding chute 21321. On fourth limiting part 233, curved elastic sheets may be provided and abut second isolating part 212.

Preferably, third limiting part 223 and fourth limiting part 233 may be bent bulging toward first electrical connection component 12 and conducting ring 131 respectively to improve the stability of the electrical connection. Under elastic action, the bent bulges may be compressed inwardly to make up the gap caused by abrasion and keep abutting the corresponding parts. One end of inner ring 2131 may penetrate the second wiring cavity to isolate first abutting part 221 from second abutting part 231.

The bases of female connector 2 and male connector 1 may be made of insulating plastics. First electrical connection component 12, second electrical connection component 13, third electrical connection component 22, and fourth electrical connection component 23 may be made of conductive materials such as copper.

In production, the first electrical connection component may be screwed into the mounting part; the second electrical connection component may be inserted in the first wiring cavity from the plugging cavity until the elastic sheet on the second limiting part passes through the second isolating part, becomes released from the state of compression, and abuts the second isolating part. At this time, the turning edge also may abut the plugging part, getting the second electrical connection component limited and fixed. To this end, the assembly of the male connector may be completed. The female connector may be connected by having the third and fourth electrical connection components inserted in the female connector base from the second wiring cavity till the elastic sheet limits the position.

The following describes the using procedure of the 360-degree rotary electrical connector taking the connections between the tree trunks as examples.

The male connector and female connector may be mounted in the first trunk and second trunk respectively. The first electrical connection component may be connected to the positive (or negative) electrode of the first trunk and the second electrical connection component may be connected to the negative (or positive) electrode of the first trunk; the third electrical connection component may be connected to the positive (or negative) electrode of the second trunk and the fourth electrical connection component may be connected to the negative (or positive) electrode of the second trunk; the first and second trunks may be inserted mutually while the plugging part matches the jointing part, until the male connector base abuts the female connector base. At this time, the first electrical connection component may be inserted in the inner ring and abut the third electrical connection component frictionally, and the second electrical connection component may be inserted between the inner ring and outer ring and abut the fourth electrical connection component frictionally, forming a complete circuit. When the first and second trunks are in relative rotation, the first and third electrical connection components may be in relative rotation but still keep abutting and thus are energized; meanwhile, the second and fourth electrical connection components also may be in relative rotation but still keep abutting and thus are energized. Therefore, even during a rotation above 360, the first and second trunks can keep a normal electrical connection still, making the electrical elements placed on the trunks available for normal use.

For the 360-degree rotary electrical connector, its female connector and male connector are set in two relatively rotating parts respectively, making the electrical connector available to keep power flowing during the 360-degree rotation while realizing fast connection of the parts, hence the advantages of convenient connection and stable power flowing without affecting the appearance of the parts. The 360-degree rotary electric connector according to embodiments of the present disclosure may have the advantages of keeping power on during the rotation process and having a simple structure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A 360-degree rotary electrical connector assembly comprising:
- a male connector comprising:
  - a male connector base comprising:
    - a first peripheral part; and
    - a first isolating part,
    - wherein the first isolating part is set in the first peripheral part and divides an inner cavity of the first peripheral part into a first wiring cavity and a plugging cavity, and
    - wherein first and second electrical connection components pass through the first isolating part,
  - a mounting part that set on the first isolating part and in the first wiring cavity;
  - the first electrical connection component fixed at an axis of the male connector base, the first electrical connection component having a columned contact part and a first limiting part connected with the columned contact part, wherein the first limiting part is connected to a mounting hole in the mounting part through a screw thread; and
  - the second electrical connection component inserted in the male connector base, the second electrical connection component having a conducting ring set at a coaxial spacing with the first electrical connection component;
- a female connector comprising:
  - a female connector base that is cased in the male connector base by rotating;
  - a third electrical connection component inserted in the female connector base, wherein the third electrical connection component abuts the columned contact part frictionally; and
  - a fourth electrical connection component inserted in the female connector base, wherein the fourth electrical connection component abuts the conducting ring frictionally, and
- wherein the male connector and the female connector are inserted in and match each other.

2. The 360-degree rotary electrical connector assembly of claim 1, wherein the columned contact part and the conducting ring are located in the plugging cavity.

3. The 360-degree rotary electrical connector assembly of claim 1, the female connector base further comprising:
- a second peripheral part with a second wiring cavity set in the second peripheral part; and
- a second isolating part provided in the second peripheral part,
- wherein the second isolating part divides the plugging cavity and the second wiring cavity, and
- wherein the third and fourth electrical connection components pass through the second isolating part.

4. The 360-degree rotary electrical connector assembly of claim 1, the male connector base further comprising:
- a plugging part that is set on the first isolating part and in the plugging cavity.

5. The 360-degree rotary electrical connector assembly of claim 3, the female connector base further comprising:
- a jointing part matching the plugging part, wherein the jointing part comprises an inner ring and outer ring that are coaxial and clamped on an inside and outside of a plugging part.

6. The 360-degree rotary electrical connector assembly of claim 1, the second electrical connection component further comprising:
- a second limiting part connected with the conducting ring, wherein a curved elastic sheet is provided on the second limiting part,
- wherein the second limiting part penetrates the first wiring cavity so that the elastic sheet abuts the first isolating part, and
- wherein the conducting ring covers outside a plugging part and comprises a turning edge for cladding an end face of the plugging part.

7. The 360-degree rotary electrical connector assembly of claim 6, the third electrical connection component further comprising:

a first abutting part, wherein the first abutting part is in a second wiring cavity and abuts a second isolating part; and a third limiting part having a curved elastic sheet, wherein the third limiting part penetrates the second wiring cavity so that the elastic sheet abuts the second isolating part.

8. The 360-degree rotary electrical connector assembly of claim 7, the fourth electrical connection component further comprising:

a second abutting part in the second wiring cavity and abutting the second isolating part; and a fourth limiting part having a curved elastic sheet, wherein the fourth limiting part penetrates the second wiring cavity so that the elastic sheet abuts the second isolating part.

9. The 360-degree rotary electrical connector assembly of claim 6, the first electrical connection component further comprising a first wiring part connected with the first limiting part;

the second electrical connection component further comprising a second wiring part connected with a second limiting part;

wherein the first and second wiring parts are in the first wiring cavity and extend in the direction of the axis away from the first isolating part;

the third electrical connection component further comprising a third wiring part connected with the first abutting part; and the fourth electrical connection component further comprising a fourth wiring part connected with the second abutting part, wherein the third and fourth wiring parts are in the second wiring cavity and extend in the direction of the axis away from the second isolating part.

10. The 360-degree rotary electrical connector assembly of claim 6 further comprising:

an avoiding slot corresponding to the second wiring part provided on a first peripheral part.

11. The 360-degree rotary electrical connector assembly of claim 7 further comprising:

a first sliding chute interconnected with a second wiring cavity set on an inner ring and interconnected with an inner cavity of an inner ring, wherein the third limiting part is inserted in the first sliding chute; and a second sliding chute interconnected with the second wiring cavity set on the outer ring and interconnected with the inner cavity of the outer ring, wherein the fourth limiting part is inserted in the second sliding chute.

12. The 360-degree rotary electrical connector assembly of claim 6 further comprising:

a first card slot extending axially outside a first peripheral part, the first card slot having a first location hole penetrating a first supporting part; and a second card slot extending axially outside a second peripheral part, the second card slot having a second location hole penetrating a second supporting part.

13. The 360-degree rotary electrical connector assembly of claim 6, the male connector base further comprising a first supporting part provided symmetrically on two sides of a mounting part and connected to a first peripheral part; and the female connector base further comprising a second supporting part set symmetrically inside a second peripheral part.

* * * * *